United States Patent [19]

Kobari et al.

[11] 4,409,648

[45] Oct. 11, 1983

[54] APPARATUS FOR PREVENTING PHASE CONTROL MECHANISM MALFUNCTION

[75] Inventors: Katsuo Kobari, Tachikawa; Yoshiaki Hachisuka, Hachioji, both of Japan

[73] Assignee: Fanuc Ltd., Tokyo, Japan

[21] Appl. No.: 314,468

[22] Filed: Oct. 23, 1981

[51] Int. Cl.³ ............................................. H02H 7/125
[52] U.S. Cl. ..................................... 363/54; 318/803; 363/87
[58] Field of Search ............... 318/345 C, 345 G, 762, 318/803; 363/54, 87, 129

[56] References Cited

U.S. PATENT DOCUMENTS

| | | | |
|---|---|---|---|
| 3,304,486 | 2/1967 | Michaels | 363/87 |
| 3,579,079 | 5/1971 | Kelly, Jr. | 363/54 |
| 3,671,836 | 6/1972 | Kolatorwicz et al. | |
| 3,746,966 | 7/1973 | Török et al. | 363/87 |
| 4,128,869 | 12/1978 | Ermolovich et al. | 363/87 |
| 4,184,086 | 1/1980 | Sagawa et al. | |

Primary Examiner—William M. Shoop
Attorney, Agent, or Firm—Staas & Halsey

[57] ABSTRACT

An apparatus for preventing malfunctions in a phase control mechanism of the type in which the firing angle of thyristors in a thyristor bridge is controlled to regulate the rotational speed of a DC motor comprising the load of the thyristor bridge. Thyristor firing pulses are produced each time a rising analog speed command signal generated in response to the phases of a N-phase power supply intersects N-number of sawtooth signals. Immediately after the generation of each firing pulse, the thyristors are not supplied with firing pulses for a time interval at least equivalent to the thyristor commutation overlap time.

7 Claims, 9 Drawing Figures

APPARATUS FOR PREVENTING PHASE CONTROL MECHANISM MALFUNCTION

FIELD OF THE INVENTION

This invention relates to a circuit for preventing a malfunction in a phase control mechanism for controlling the firing angle of thyristors in an apparatus of the type that drives a DC motor by means of thyristors.

A motor control system which is well-known in the art is adapted to drive a DC motor by using a thyristor bridge to rectify an AC voltage. A motor control system of this type is arranged to vary the firing angle of the thyristors that construct the thyristor bridge, thereby changing the mean value of the voltage applied to the armature of the DC motor so that the speed of the motor can be regulated. The described control system therefore is used in speed control devices such as those applied to regulating the speed of a spindle motor in a machine tool where there is a need to vary the rotational speed.

FIG. 1 is a block diagram showing the principal portion of unidirectional-type motor control apparatus for rectifying a three-phase AC power supply by a thyristor bridge in order to drive a DC motor. In FIG. 1, numeral 1 denotes a three-phase power supply whose output is connected, through a reactor 14, to a thyristor bridge 2 comprising six thyristors $TH_1$, $TH_1'$, $TH_2$, $TH_2'$, $TH_3$, $TH_3'$. The rectified output of the thyristor bridge 2 is applied to a DC motor 3, the current $I_a$ flowing through the motor being sensed by a direct current sensor 4. The output of the sensor 4 is fed to a summing point 5 whose other input is a firing control signal FS which will be described below. The output of the summing point is connected to an amplifier 6, whose output is in turn connected to a limiter 7. The output of the limiter 7 is applied to a sawtooth generator 8, and to a firing phase control circuit 9, the latter including U-, V- and W-phase firing circuits $9u$, $9v$ and $9w$ for controlling the U-, V- and W-phase firing angles, respectively. A speed feedback loop, comprising a main loop, is deleted from FIG. 1 in order to simplify the description.

The sawtooth generator 8 generates three sawtooth signals $8u$, $8v$, $9w$ which are displaced in phase from one another by 60 degrees, as shown in FIG. 2A. The sawtooth signals $8u$, $8v$, $8w$ are applied as inputs to the U-, V- and W-phase firing circuits $9u$, $9v$, $9w$, respectively of the the firing phase control circuit. Each of the firing circuits $9u$, $9v$, $9w$ includes a comparator (not shown) for comparing the respective sawtooth signal with the phase control input signal FS from the limiter 7, and a circuit (not shown) for forming a thyristor firing signal on the basis of the comparator output. More specifically, and again with reference to FIG. 2, the firing circuits $9u$, $9w$, $9v$ compare the sawtooth signals and the firing control input signal FS, as shown in FIG. 2(A), form three-phase rectangular signals based upon the results of the comparison operation, as shown in FIG. 2(B), and then produce thyristor firing pulses $th_1$, $th_1'$, $th_2$, $th_2'$, $th_3$, $th_3'$ on the basis of the rectangular signals, as shown in FIG. 2(C).

The apparatus of the aforesaid type has long been available in the art, and is described and illustrated in U.S. Pat. No. 4,288,782 and U.S. Pat. No. 4,322,671, by way of example. A detailed description of the apparatus will therefore be deleted.

When there is to be an abrupt increase in the r.p.m. of DC motor 3 in the foregoing apparatus, there is sharp rise in the level of an analog speed command signal provided by a numerical control device or the like. This is accompanied by a sharp rise in the firing control input signal FS, which is subjected to a current feedback signal. Consequently, as shown in FIG. 2(A), there are many instances where the signal FS crosses the sawtooth signal $8v$ at point A and then immediately crosses the sawtooth signal $8w$ at point B within the thyristor commutation overlap time period u. The reason for this is as follows, when the current rises without a time delay at point in time A, the rise in the signal FS is suppressed by the current feedback signal. In the above case, however, the rise of the current is delayed by the commutation overlap time, so the current feedback signal cannot suppress the signal FS. When the signal FS crosses the two sawtooth signals in such a short time interval, the thyristors are misfired and an excessive current of a possibly damaging magnitude flows into the thyristor bridge.

SUMMARY OF THE INVENTION

Accordingly, an object of the present invention is to provide an apparatus for preventing a malfunction in a phase control mechanism that controls the firing angle, of the thyristors in a thyristor bridge, to regulate the rotational speed of a DC motor comprising the load of the thyristor bridge, the apparatus prevents a malfunction even when the level of an analog speed control signal is changed in an abrupt manner.

Another object of the present invention is to provide an apparatus for preventing a malfunction in a phase control mechanism that controls the firing angle, of the thyristors in a thyristor bridge, to regulate the rotational speed of a DC motor comprising the load of the thyristor bridge, the apparatus prevents irratic firing of thyristors even when the level of an analog speed control signal is changed in an abrupt manner.

These and other objects and features of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
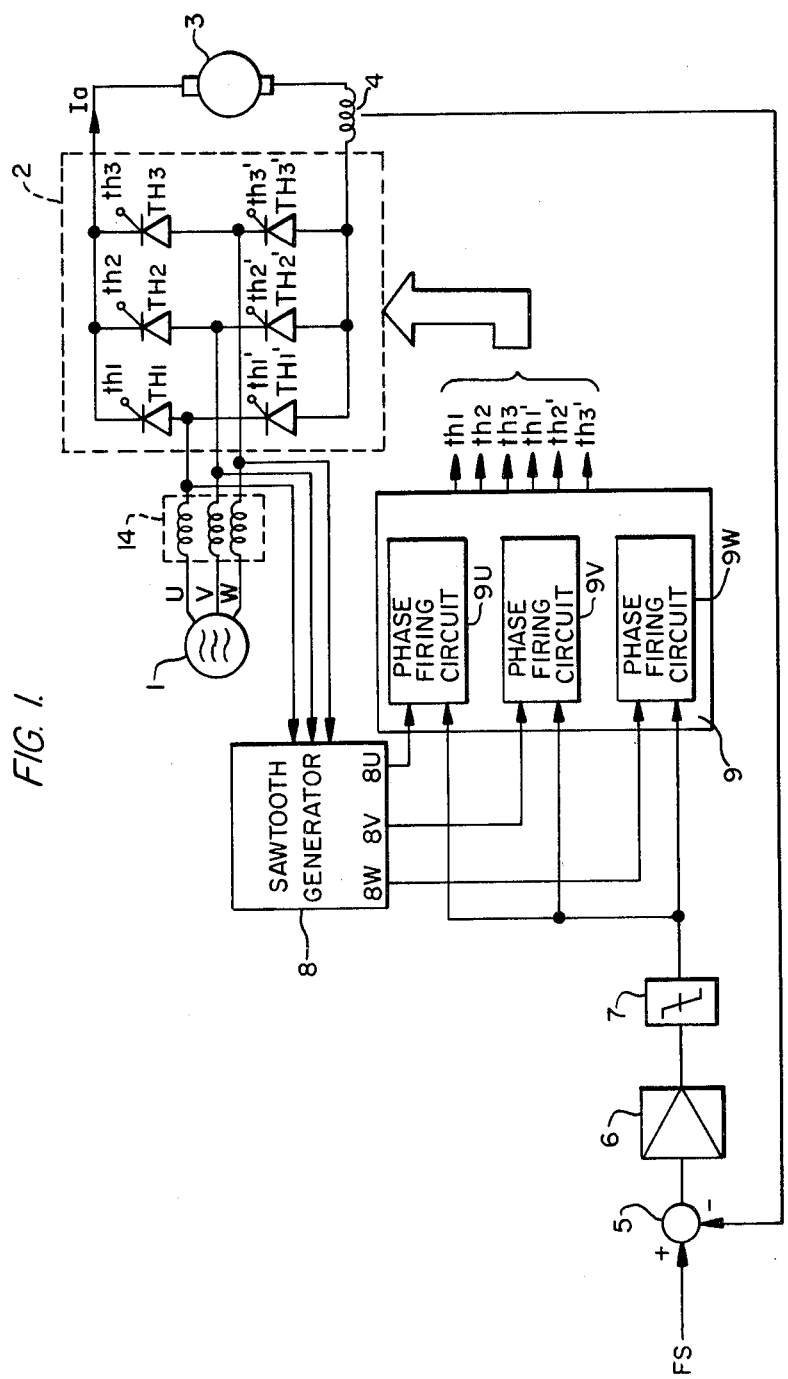
FIG. 1 is a block diagram of the conventional apparatus.
Figure 2:
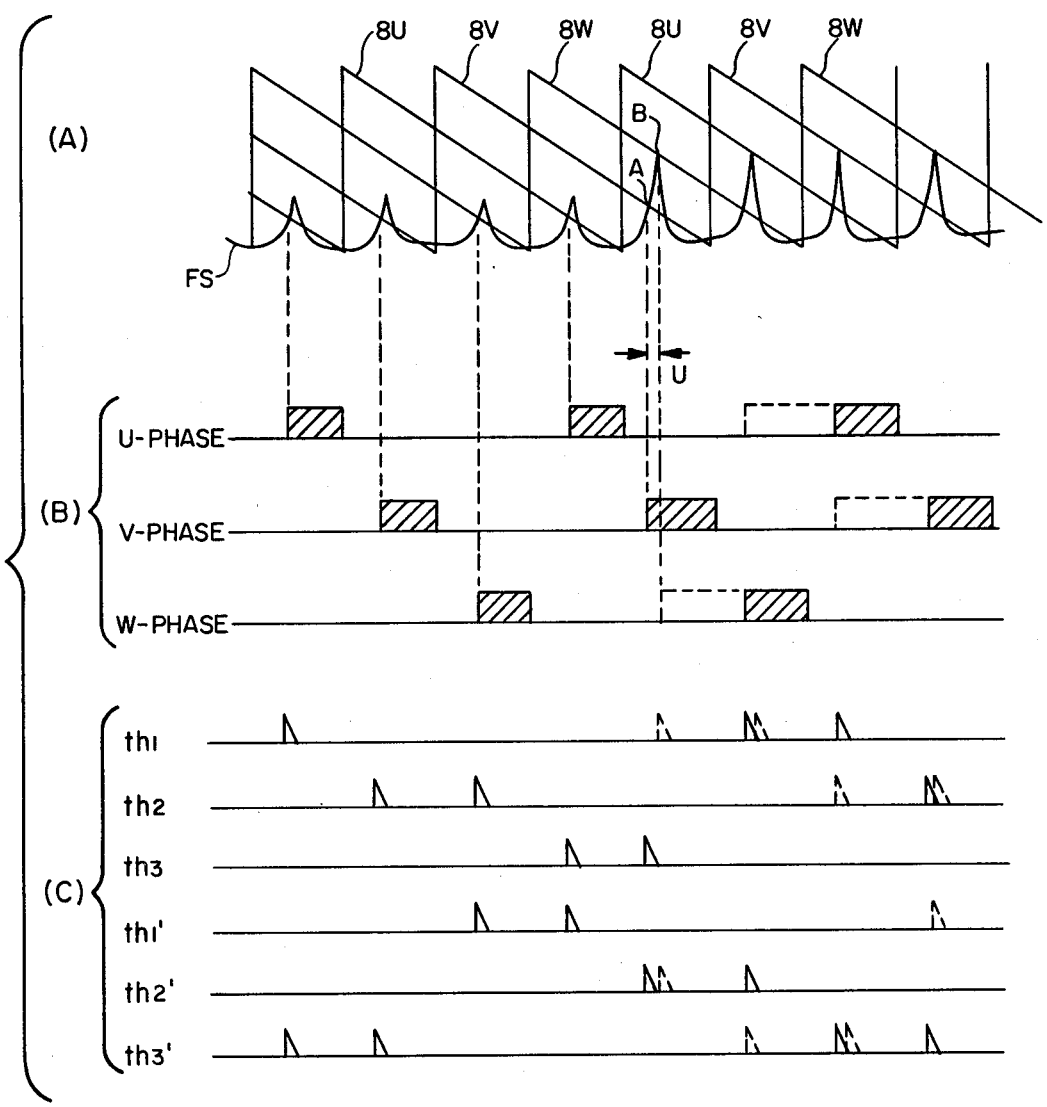
FIGS. 2(A) through 2(C) are waveform diagrams of signals associated with various portions of the apparatus shown in FIG. 1.
Figure 3:
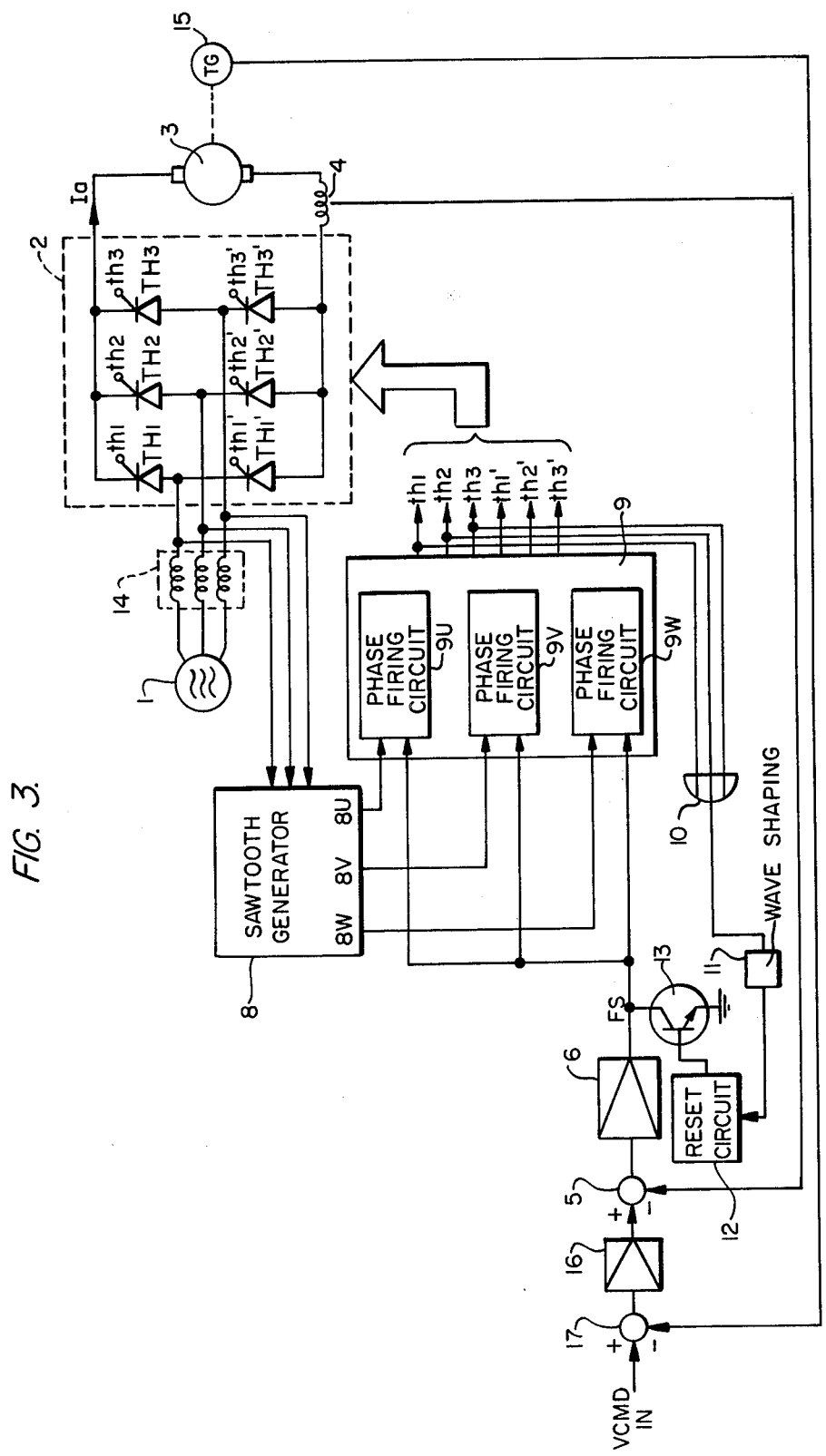
FIG. 3 is a block diagram illustrating an embodiment of the apparatus according to the present invention.
Figure 4:
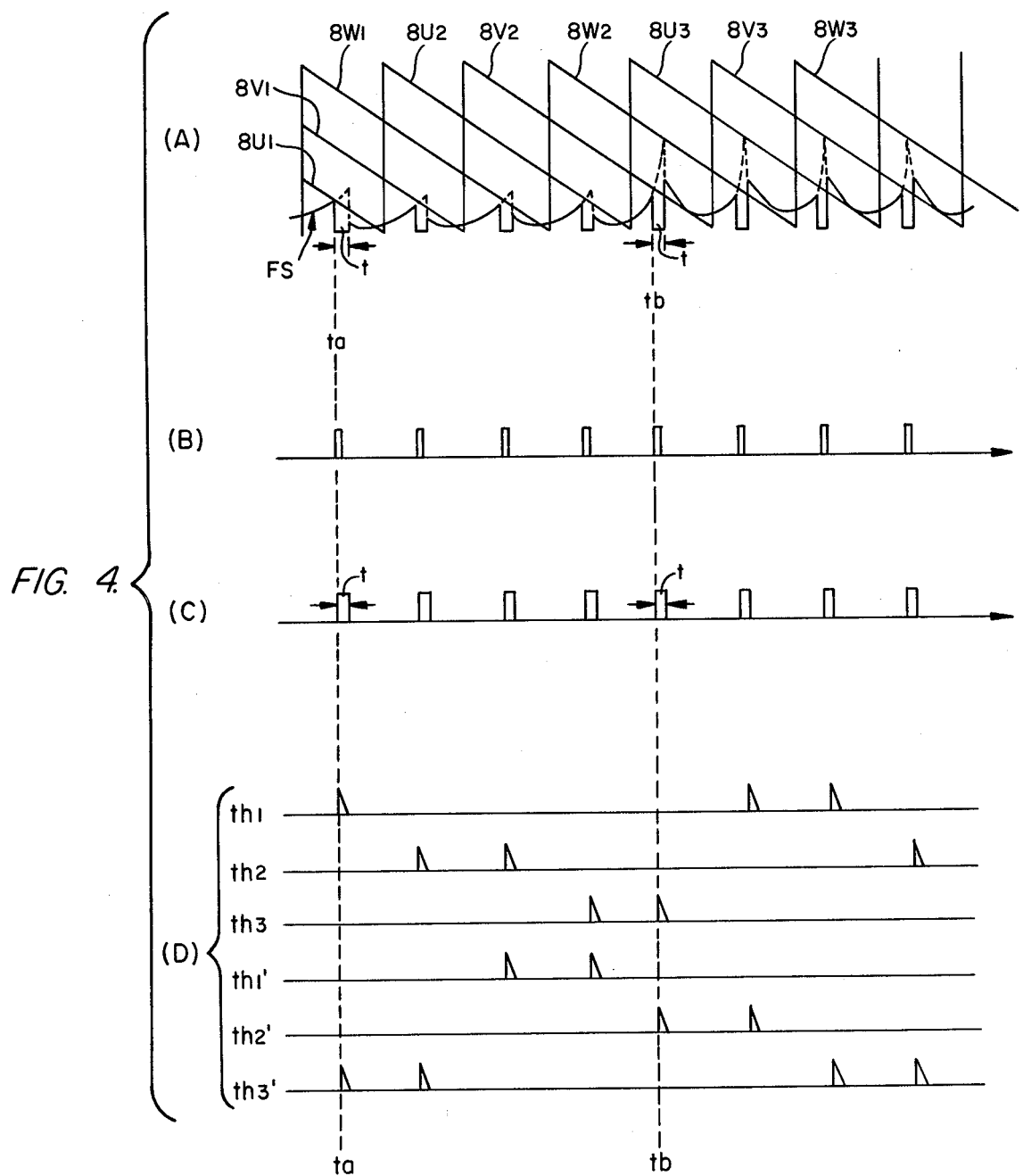
FIGS. 4(A) through 4(D) are waveform diagrams of signals associated with various portions of the apparatus shown in FIG. 3.

Referring now to FIG. 3, numeral 10 denotes an OR circuit having three signal inputs which are the firing pulses $th_1$, $th_2$, $th_3$ for the respective thyristors $TH_1$, $TH_2$, $TH_3$, the firing pulses being obtained from the firing phase control circuit 9. The output of OR circuit 10 is connected to a wave-shaping circuit 11 which shapes the arriving firing pulses into short rectangular pulses, as shown in FIG. 4(B). These pulses are applied to a firing circuit input reset circuit 12. The latter circuit, which comprises a monostable multivibrator, which produces a rectangular pulse having a pulse width t, as shown in FIG. 4(C), each time a pulse is delivered by the OR gate circuit 10. The pulse width t is set equal to or slightly larger than, the thyristor commutation overlap time. The pulsed output of circuit 12 is connected to an input signal control circuit 13 comprising a transistor. When a rectangular pulse from circuit 12 enters the input signal control circuit 13, the output of amplifier 6 is shorted to ground for the interval t. Further, numeral 15 denotes a tachometer generator, 16 an amplifier, and 17 a summing point. Portions corresponding to those shown in FIG. 1 are denoted by like reference characters and are not be described again here.

The apparatus according to the present invention operates in the following manner. A speed command signal VCMD is applied to the apparatus input terminal IN. The signal is initially at a comparatively low level, so that the DC motor 3 is rotated at low speed. The speed command signal VCMD is subjected to negative feedback at the summing point 17 due to a signal from the tachometer generator 15. An error signal, derived at the summing point 17, from the signal VCMD and the feedback signal, is amplified by amplifier 16 and then applied to summing point 5 where it is subjected to negative feedback by the signal from the current sensor 4. The resulting error signal is amplified by amplifier 6 to produce the firing control input signal FS, which is in turn applied to the U-, V- and W-phase firing circuits $9u$, $9v$, $9w$, whose other inputs are the sawtooth signals $8u$, $8v$, $8w$, respectively. With the passage of time, the magnitude of signal FS equals the magnitude of the incline of sawtooth signal $8u$, to the U-phase firing circuit 9 at time $t_a$. This event is sensed by U-phase firing circuit $9u$ which responds by generating a signal initiating the firing phase control circuit 9 produce the firing pulses $th_1$, $th_3'$. These pulses $th_1$, $th_3'$ are applied to the respective thyristors $TH_1$, $TH_3'$ which are fired and conduct. The firing pulse $th_1$, after passing through the OR circuit 10, is shaped by wave-shaping circuit 11 into the pulse depicted in FIG. 4(B), and is then applied to the firing circuit input reset circuit 12. Circuit 12 responds to the received pulse by producing the signal pulse, shown in FIG. 4(C), that is applied to the input signal control circuit 13. Due to the width t of this signal, the input signal control circuit 13 is turned ON, conducts, for the time interval t, that is, at least for a period of time equivalent to the thyristor commutation overlap time. Accordingly, the firing control input signal FS is shorted to ground, temporarily dropping to zero for the interval t before rising again, as illustrated in FIG. 4(A).

The foregoing operation continues in the manner described until, at time $t_b$, the firing control input signal FS experiences a sharp rise. The magnitude of the signal FS equals the magnitude of the incline of sawtooth signal $8v_2$ applied the V-phase firing circuit $9v$, which event is sensed by circuit $9v$ which responds by producing a signal. The firing phase control circuit 9 produces the firing pulses $th_3$, $th_2'$ of the signal, as shown in FIG. 4(D). The firing pulses $th_3$, $th_2'$ are applied to the respective thyristors $TH_3$, $TH_2'$ to render them conductive. Firing pulse $th_3$, after passing through the OR gate 10, is shaped by wave-shaping circuit 11 into the pulse depicted in FIG. 4(B), and is then applied to the firing circuit input reset circuit 12. As described above, circuit 12 responds to the received pulse to produce the signal pulse shown in FIG. 4(C). This pulse is applied to the input signal control circuit 13 which therefore conducts for the time interval t, that is, at least for a period of time equivalent to the thyristor commutation overlap time. As before, the firing control input signal FS temporarily drops to zero for the interval t and then rises again. Thus, the signal FS, which attempts to rise sharply after intersecting the sawtooth signal $8v_2$ at time $t_b$, as shown by the dotted line in FIG. 4(A), is prevented from doing so by being shorted to ground for the interval of time that the input signal control circuit 13 is conducting. At the instant that the input control circuit 13 stops conducting, signal FS is already at a much lower level. In accordance with the invention, therefore, signal FS cannot cross the next sawtooth signal $8w_2$ within the time interval t. This means that there is no disturbance in the timing of the firing pulses that fire the thyristors, thus assuring that the DC motor will be rotated in a smooth manner.

In the foregoing embodiment, the firing control input signal FS is shorted to ground, for an interval equal to at least the thyristor commutation overlap time, after the generation of each thyristor firing pulse. In an alternative arrangement, however, the level of the signal delivered by the firing circuit input reset circuit 12 can be adjusted in such a manner that the transistor comprising the input signal control circuit 13 is operated in the nonsaturated region, so that the firing control input signal is held at a constant level which is higher than zero.

The present invention is also applicable to an arrangement in which a DC motor is controlled by an open loop configuration, without the signal indicating the motor speed being fed back to the input side of the phase control mechanism.

According to the present invention, as described in detail above, when a firing control input signal changes abruptly during thyristor commutation, in a thyristor bridge, an input signal control circuit holds said signal at a level low enough to avoid misfiring during thyristor commutation. This makes it possible to prevent irratic firing control of the thyristors.

As many apparently widely different embodiments of the present invention can be made without departing from the spirit and scope thereof, it is to be understood that the invention is not limited to the specific embodiment thereof except as defined in the appended claims.

What we claim is:

1. An apparatus for preventing malfunctions in a phase control mechanism operatively connectable to receive an analog firing control input signal, and to receive N-number sawtooth signals, said apparatus comprising:

a thyristor bridge, including a plurality of thyristors, operatively connected to receive N-phase power from an N-phase power supply;

a firing angle control circuit operatively connected to said plurality of thyristors, and having an input terminal, for generating thyristor firing pulses to control the firing angle of said plurality of thyristors in response to comparing said analog firing control input signal, arriving at said input terminal of the firing angle control circuit, with each of said N-number of sawtooth signals;

an input signal control circuit, connected to receive the analog firing control input signal received at the input terminal of said firing angle control circuit, for controlling the level of said analog firing control input signal; and a firing circuit input reset circuit, operatively connected to receive and controlled by said thyristor firing pulses, for enabling said input signal control circuit for at least an interval of time equivalent to the commutation overlap time of said thyristors;

said analog firing control input signal held at a constant level by said input signal control circuit immediately after the generation of each of said thyristor firing pulses.

2. The apparatus according to claim 1, wherein said input signal control circuit comprises a transistor which is conductive when said input control circuit is enabled, so that the input to said firing angle control circuit is shorted to ground to establish zero potential at said input.

3. A phase control mechanism operatively connectable to a motor load for controlling the firing angle of thyristors, comprising:

a thyristor bridge including a plurality of thyristors, for regulating the motor load connected to the thyristor bridge;

a motor current sensor, operatively connected to the motor load, for providing a load current signal;

a motor control circuit operatively connected to the motor, load and having an input; and a closed loop, operatively connecting said motor current sensor and the motor control circuit, for negatively feeding the load current signal back to the input of the motor control circuit; and a firing angle control circuit, operatively connected to the motor control circuit and the thyristor bridge, for generating thyristor firing pulses, said firing angle control circuit having an input terminal for receiving a firing control input signal;

an apparatus for preventing malfunctions in said control mechanism, said apparatus comprising:

an input signal controal circuit, connected to the input terminal of said firing angle control circuit, for controlling the level of said firing control input signal; and a firing circuit input reset circuit, operatively connected to receive and controlled by said thyristor firing pulses, for enabling said input signal control circuit for at least an interval of time equivalent to the communication overlap time of said thyristors, said firing control input signal held at a constant level by said input signal control circuit immediately after the generation of each said thyristor firing pulses.

4. The apparatus according to claim 3, wherein said input signal control circuit comprises a transistor which is conductive when said input control circuit is enabled, so that the input to said firing angle control circuit is shorted to ground to establish zero potential at said input.

5. An apparatus for preventing malfunctions in a phased control mechanism operatively connectable to receive N-phase power and to receive an analog firing control input signal, comprising:

thyristors, each having a firing pulse input and a commutation overlap time, and operatively connected to receive a respective phase of said N-phase power;

sawtooth signal generating means, operatively connected to receive said N-phase power, for generating sawtooth signals in response to said N-phase power;

firing angle control means, operatively connected to respective ones of said firing pulse inputs of said thyristors, for generating firing pulses in response to said analog firing control input signal and said sawtooth signals;

firing pulse detecting means, operatively connected to receive said firing pulses, for generating a detection signal in response to receiving at least one of said firing pulses;

reset means operatively connected to receive said detection signal, for providing an enable signal in response to receiving said detection signal and;

input signal control means, operatively connected to said reset means and to receive said analog firing control input signal, for holding said analog firing control input signal at a constant level in response to receiving said enable signal.

6. The apparatus according to claim 5, further comprising:

wave shaping means, operatively connected between said firing pulse detecting means and said reset means, for shaping said detection signal.

7. The apparatus according to claim 5, wherein said reset means comprises means for providing said enable signal at least during said commutation overlap time.

* * * * *

UNITED STATES PATENT AND TRADEMARK OFFICE
CERTIFICATE OF CORRECTION

PATENT NO.  : 4,409,648
DATED       : October 11, 1983
INVENTOR(S) : Kobari et al.

It is certified that error appears in the above-identified patent and that said Letters Patent is hereby corrected as shown below:

Front page, after "[22] Filed: Oct. 23, 1981" insert on next line
--Foreign Application Priority Data
   Oct. 30, 1980 [JP] Japan....55-152698--.
[57] ABSTRACT, line 7, delete "generated in response to the phases of a N-phase";
           line 8, delete "power supply"; after "signals" insert --generated in response to the phases of a N-phase power supply--.

Column 1, line 48, delete "the" (first occurrence).
Column 3, line 33, after "8u," insert --applied--;
         line 36, after "9" insert --to--;
         line 60, change "of" to --in response to--.
Column 4, line 10, change "is conducting" to --conducts--.
Column 5, line 25, delete ","; delete "and" (second occurrence);
         line 38, change "controal" to --control--.

Column 6, line 34, change "and;" to --; and--.

Signed and Sealed this

Twenty-eighth Day of February 1984

[SEAL]

Attest:

GERALD J. MOSSINGHOFF

*Attesting Officer*                *Commissioner of Patents and Trademarks*